United States Patent
Frankel et al.

(10) Patent No.: US 9,515,767 B2
(45) Date of Patent: Dec. 6, 2016

(54) MULTI-CHANNEL OPTICAL TRANSCEIVER WITH OFFSET QUADRATURE AMPLITUDE MODULATION

(71) Applicants: Michael Y. Frankel, Baltimore, MD (US); Christian Bourget, Stittsville (CA); Michael J. Wingrove, Kanata (CA)

(72) Inventors: Michael Y. Frankel, Baltimore, MD (US); Christian Bourget, Stittsville (CA); Michael J. Wingrove, Kanata (CA)

(73) Assignee: Ciena Corporation, Hanover, MD (US)

(*) Notice: Subject to any disclaimer, the term of this patent is extended or adjusted under 35 U.S.C. 154(b) by 302 days.

(21) Appl. No.: 13/927,901

(22) Filed: Jun. 26, 2013

(65) Prior Publication Data
US 2013/0287398 A1 Oct. 31, 2013

Related U.S. Application Data

(62) Division of application No. 12/691,474, filed on Jan. 21, 2010, now Pat. No. 8,498,542.

(51) Int. Cl.
*H04B 10/06* (2006.01)
*H04B 10/00* (2013.01)
(Continued)

(52) U.S. Cl.
CPC ........... *H04J 14/06* (2013.01); *H04B 10/5053* (2013.01); *H04B 10/541* (2013.01);
(Continued)

(58) Field of Classification Search
CPC . H04B 10/5053; H04B 10/541; H04B 10/548; H04B 10/06; H04B 10/61; H04B 10/614; H04B 10/675; H04B 10/6165; H04B 10/6161; H04B 10/00; H04B 10/12; H04B 10/64; H04B 10/676; H04L 27/06; H04J 14/06
(Continued)

(56) References Cited

U.S. PATENT DOCUMENTS 5,243,629 A * 9/1993 Wei ..................... H04L 27/2604
348/437.1
5,452,015 A * 9/1995 Hulyalkar .............. H04N 5/211
348/21

(Continued)

OTHER PUBLICATIONS

Yan Tang and William Shich, Members IEEE; "Coherent Optical OFDM Transmission UP to 1 Tb/s per Channel"; Journal of Lightwave Technology, vol. 27, No. 16, Aug. 15, 2009.

(Continued)

*Primary Examiner* — Ken N Vanderpuye
*Assistant Examiner* — Abbas H Alagheband
(74) *Attorney, Agent, or Firm* — Clements Bernard PLLC; Christopher L. Bernard; Lawrence A. Baratta, Jr.

(57) ABSTRACT

The present disclosure provides a multi-carrier optical transmitter, receiver, transceiver, and associated methods utilizing offset quadrature amplitude modulation thereby achieving significant increases in spectral efficiency, with negligible sensitivity penalties. In an exemplary embodiment, an optical transmitter includes circuitry configured to generate a plurality of optical subcarriers, a plurality of data signals for each of the plurality of subcarriers, and a plurality of modulator circuits for each of the plurality of subcarriers, wherein each of the plurality of modulator circuits includes circuitry configured to offset an in-phase component from a quadrature component of one of the plurality data signals by one-half baud period.

15 Claims, 10 Drawing Sheets

(51) Int. Cl.
| | |
|---|---|
| *H04B 10/12* | (2006.01) |
| *H04J 14/06* | (2006.01) |
| *H04B 10/50* | (2013.01) |
| *H04B 10/54* | (2013.01) |
| *H04B 10/61* | (2013.01) |
| *H04B 10/64* | (2013.01) |
| *H04B 10/67* | (2013.01) |
| *H04B 10/548* | (2013.01) |

(52) U.S. Cl.
CPC .......... *H04B 10/548* (2013.01); *H04B 10/61* (2013.01); *H04B 10/614* (2013.01); *H04B 10/6161* (2013.01); *H04B 10/6162* (2013.01); *H04B 10/64* (2013.01); *H04B 10/676* (2013.01); *H04B 10/12* (2013.01)

(58) Field of Classification Search
USPC .............. 398/184, 192, 193, 185, 208, 65, 136,398/147, 158, 149, 209
See application file for complete search history.

(56) References Cited

U.S. PATENT DOCUMENTS

| | | | | |
|---|---|---|---|---|
| 5,477,199 A * | 12/1995 | Montreuil | ................ | H03C 3/40 329/308 |
| 5,489,879 A * | 2/1996 | English | ................ | H04H 20/34 332/103 |
| 5,805,321 A * | 9/1998 | Ooi et al. | ................ | 398/98 |
| 5,894,592 A * | 4/1999 | Brueske | ................ | H03C 3/0941 332/127 |
| 6,249,554 B1 * | 6/2001 | Mobin | ................ | H04L 27/3809 375/316 |
| 6,370,211 B1 * | 4/2002 | Carsello | ................ | H04L 5/06 375/285 |
| 6,424,444 B1 * | 7/2002 | Kahn | ................ | H04B 10/5161 398/141 |
| 6,445,476 B1 * | 9/2002 | Kahn | ................ | G02F 1/0327 359/245 |
| 6,490,069 B1 * | 12/2002 | Kahn | ................ | H04B 10/25137 398/183 |
| 7,146,109 B2 * | 12/2006 | Chen et al. | ................ | 398/183 |
| 7,292,792 B2 * | 11/2007 | Chen | ................ | H04B 10/506 398/102 |
| 7,813,654 B1 * | 10/2010 | Ng et al. | ................ | 398/198 |
| 8,073,338 B2 * | 12/2011 | Buelow | ................ | H04B 10/505 398/184 |
| 8,131,148 B2 * | 3/2012 | Sun | ................ | H04B 10/0799 398/158 |
| 8,135,279 B2 * | 3/2012 | Mertz | ................ | H04B 10/67 398/202 |
| 8,180,227 B2 * | 5/2012 | Liu | ................ | H04B 10/61 398/203 |
| 8,184,728 B1 * | 5/2012 | Mahmoud | ................ | H04L 27/2634 375/260 |
| 8,218,979 B2 * | 7/2012 | Liu | ................ | H04B 10/2513 398/202 |
| 8,253,466 B2 * | 8/2012 | Jeffries | ................ | H03K 3/356113 327/238 |
| 8,285,148 B2 * | 10/2012 | Haunstein | ................ | H04B 10/60 398/158 |
| 8,595,748 B1 * | 11/2013 | Haggerty | ................ | H04W 4/18 455/466 |
| 2003/0011854 A1 * | 1/2003 | Kahn | ................ | H04B 10/5161 398/141 |
| 2003/0100283 A1 * | 5/2003 | Wu | ................ | H03J 7/20 455/258 |
| 2003/0169824 A1 * | 9/2003 | Chayat | ................ | H04L 5/06 375/260 |
| 2003/0184374 A1 * | 10/2003 | Huang et al. | ................ | 330/149 |
| 2003/0227989 A1 * | 12/2003 | Rhee et al. | ................ | 375/376 |
| 2004/0071157 A1 * | 4/2004 | Feldman | ................ | H04L 25/4908 370/463 |
| 2005/0068887 A1 * | 3/2005 | Chen | ................ | H04B 10/506 370/215 |
| 2005/0128554 A1 * | 6/2005 | Wickham et al. | ............ | 359/237 |
| 2006/0285854 A1 * | 12/2006 | Sun | ................ | H03L 7/085 398/155 |
| 2007/0093228 A1 * | 4/2007 | Bayruns | ................ | H04B 1/28 455/293 |
| 2008/0298440 A1 * | 12/2008 | Kroeger | ................ | H04H 20/30 375/150 |
| 2009/0153212 A1 * | 6/2009 | Jeffries et al. | ................ | 327/254 |
| 2009/0157412 A1 * | 6/2009 | Iannuzzelli | ....... | H04N 21/44004 704/500 |
| 2009/0161747 A1 * | 6/2009 | Aziz et al. | ................ | 375/231 |
| 2009/0185810 A1 * | 7/2009 | Kaplan | ................ | G02F 1/225 398/184 |
| 2009/0196602 A1 * | 8/2009 | Saunders | ........... | H04B 10/5053 398/26 |
| 2009/0257755 A1 * | 10/2009 | Buelow | ................ | H04B 10/505 398/184 |
| 2009/0273494 A1 * | 11/2009 | Jeffries | ............ | H03K 3/356113 341/101 |
| 2009/0274470 A1 * | 11/2009 | Yoshino | ................ | H04B 10/61 398/183 |
| 2009/0297144 A1 * | 12/2009 | Djordevic | ........... | H04B 10/2569 398/39 |
| 2009/0297155 A1 * | 12/2009 | Weiner | ................ | H04B 1/40 398/115 |
| 2010/0021163 A1 * | 1/2010 | Shieh | ................ | 398/65 |
| 2010/0021166 A1 * | 1/2010 | Way | ................ | H04J 14/02 398/79 |
| 2010/0054357 A1 * | 3/2010 | Fujimura | ............ | H04L 27/2014 375/267 |
| 2010/0067902 A1 * | 3/2010 | Sun | ................ | H04B 10/0799 398/25 |
| 2010/0074632 A1 * | 3/2010 | Zhou | ................ | H04B 10/2513 398/208 |
| 2010/0080560 A1 * | 4/2010 | Mertz | ................ | H04B 10/67 398/76 |
| 2010/0086303 A1 * | 4/2010 | Qian | ................ | H04J 14/06 398/65 |
| 2010/0178056 A1 * | 7/2010 | Liu | ................ | H04B 10/61 398/65 |
| 2010/0178057 A1 * | 7/2010 | Shieh | ................ | H04L 25/0224 398/79 |
| 2010/0215371 A1 * | 8/2010 | Djordevia | ............ | H03M 13/31 398/79 |
| 2010/0296819 A1 * | 11/2010 | Kahn | ................ | H04B 10/60 398/158 |
| 2010/0322639 A1 * | 12/2010 | Szafraniec | ............ | H04B 10/60 398/202 |
| 2010/0329683 A1 * | 12/2010 | Liu | ................ | H04B 10/2513 398/81 |
| 2011/0002689 A1 * | 1/2011 | Sano | ................ | H04B 10/69 398/44 |
| 2011/0033182 A1 * | 2/2011 | Haunstein | ................ | H04B 10/60 398/26 |
| 2011/0069777 A1 * | 3/2011 | Hurwitz | ................ | H04L 27/34 375/285 |
| 2011/0069975 A1 * | 3/2011 | Liu | ................ | H04B 10/61 398/202 |
| 2011/0150477 A1 * | 6/2011 | Winzer | ............ | H04B 10/6971 398/65 |
| 2011/0150503 A1 * | 6/2011 | Winzer | ................ | H04B 10/60 398/202 |
| 2011/0150505 A1 * | 6/2011 | Roberts et al. | ................ | 398/208 |
| 2012/0263251 A1 * | 10/2012 | Djordjevic | ............ | H04L 1/0042 375/261 |

OTHER PUBLICATIONS

Pierre Siohan (Member IEEE), Cyrille Siclet, and Nicolas Lacaille; "Analysis and Design of OFDM/OQAM Systems Based on Filterbank Theory"; IEEE Transactions on Signal Processing, vol. 50, No. 5, May 2002.

(56) References Cited

OTHER PUBLICATIONS

Jinfeng Du, and Svante Signell, Senior Member, IEEE; Pulse Shape Adaptivity in OFDM/OQAM Systems; Communications Dept., School of Informational and Communication Technology, KTH—Royal Institute of Technology, Stockholm, Sweden.

Takayuke Kobayashi, Member IEEE, Akihide Sano, Ejichi Yamada, Member IEEE, Eiji Yoshida, and Yutaka Miyamoto, Member IEEE; Over 100 Gb/s Electro-Optically Multiplexed OFDM for High-Capacity Optical Transport Network; Journal of Lightwave Technology, vol. 27, No. 16, Aug. 2009.

Jinfeng Du, Savante Signell; "Classic OFDM Systems and Pulse Shaping OFDM/OQAM Systems"; Electronic, Computer, and Software Technology KTH—Royal Institute of Technology, Stockholm, Sweden; Feb. 2007.

Gilad Goldfarb, Guifang Li, and Michael G. Taylor, Member, IEEE; "Orthogonal Wavelength-Division Multiplexing Using Coherent Detection"; IEEE Photonics Technology Letters, vol. 18, No. 24, Dec. 15, 2007.

W. Shich, H. Bao, and Y. Tang; "Coherent Optical OFDM: Theory and Design"; Optics Express 841, vol. 16, No. 2, Jan. 21, 2008; Melbourne, AU.

A.D. Ellis, F.C.G. Gunning, B. Cuenot, T.C. Healty, E. Pincemin; "Towards 1TbE Using Coherent WDM"; Tyndall National Institute and University College Cork Dept of Physcis, Cork, Ireland; Downloaded by Ciena on Oct. 12, 2008.

\* cited by examiner

MULTI-CHANNEL OPTICAL TRANSCEIVER WITH OFFSET QUADRATURE AMPLITUDE MODULATION

CROSS-REFERENCE TO RELATED APPLICATION

The present non-provisional patent application/patent is a divisional of U.S. Provisional patent application Ser. No. 12/691,474, filed on Jan. 21, 2010, and entitled "MULTI-CHANNEL OPTICAL TRANSCEIVER WITH OFFSET QUADRATURE AMPLITUDE MODULATION," the contents of which are incorporated in full by reference herein.

FIELD OF THE INVENTION

The present invention relates generally to optical modulation. More particularly, the present invention relates to a multi-subcarrier optical transmitter, receiver, transceiver, and associated methods utilizing offset quadrature amplitude modulation thereby achieving significant increases in spectral efficiency, with negligible sensitivity penalties.

BACKGROUND OF THE INVENTION

Conventionally, fiber-optic communication networks are experiencing rapidly increasing growth of capacity. This capacity growth is reflected by individual channel data rate scaling from 10 Gbps, to 40 Gbps, to currently developing 100 Gbps, and to future projections of 1000 Gbps channels and beyond. The capacity growth is also reflected by a desire to increase aggregate fiber carrying capacity by increasing total channel count. The desired capacity growth can be addressed by several techniques. First, the bandwidth of optical amplifiers can be increased to allow wider spectral range to be used for signal transmission. This approach is viable for new network installations, where new amplifiers can be deployed. This approach is not applicable to a large base of installed networks, and would also require a development of other associated wide spectral range components, such as lasers, optical filters, and dispersion compensation modules. Another approach is to use multi-bit per symbol modulation constellations, such as M-ary quadrature amplitude modulation (M-QAM). Increasing the constellation size M increases the information transmission capacity, while keeping the signal bandwidth constant. Unfortunately, this comes at a very substantial penalty of increased noise susceptibility, and correspondingly reduced optical unregenerated reach.

Another approach is to use smaller spacing between wavelength division multiplexed (WDM) channels. Currently, per ITU standard specification, WDM channels are placed with 50 GHz spacing. Furthermore, channels are typically combined and separated using optical filters. Thus, individual channels are filtered on the transmitter side such that the overlap between adjacent channel frequency content is made negligible. Similarly, receiver side optical filtering is used to accept the frequency content of a single channel, while effectively rejecting all adjacent channels. This approach results in a substantial waste of valuable spectrum to accommodate channel isolation and filter roll-off skirts. An attractive approach for increasing spectral efficiency is to use a set of subcarriers, each modulated by data of identical rates and locked precisely to that data rate. This approach is widely used in communications, and is generally known as Orthogonal Frequency-Division Multiplexing (OFDM) in wireless or Discrete Multi-Tone (DMT) in Digital Subscriber Loop (DSL) applications.

Previous attempts to satisfy some of the above requirements for fiber-optic communication are enumerated below, with associated benefits and drawbacks. Ellis et al. in "Towards 1TbE using Coherent WDM," Opto-Electronics and Communications Conference, 2008 and the 2008 Australian Conference on Optical Fibre Technology. OECC/ACOFT 2008. 7-10 Jul. 2008, page(s): 1-4 disclose a coherent WDM approach using On-Off Keyed modulation and putting subcarriers onto a grid precisely locked to the data rate. The receiver uses optical filtering to select individual subcarriers and subsequent direct detection for conversion to electrical domain. Advantages of this approach include a relatively simple transmitter and receiver, with minimal processing and an optoelectronic component bandwidth requirement of only a single subcarrier rate. However, drawbacks are substantial and include low chromatic and polarization mode dispersion tolerance, inability to scale to phase-based or multi-symbol modulation formats, and poor amplified spontaneous emission (ASE) noise tolerance.

Coherent Optical OFDM is essentially a direct application of wireless OFDM principles to the optical domain (see, e.g., "Coherent optical OFDM: theory and design," W. Shieh, H. Bao, and Y. Tang, Optics Express, vol. 16, no 2, January 2008, pp. 841-859). "Virtual" subcarriers with superimposed data modulation are generated in digital electronics via Inverse Fast Fourier Transform (FFT) operation on the transmit side. Original data is recovered via a complementary FFT operation on the receive side. Advantages of this approach are very high tolerance to chromatic and polarization mode dispersion, scalability to arbitrary modulation constellations, and high tolerance to ASE noise. However, disadvantages are the requirement for sophisticated digital signal processing on the transmitter (FFT) and receiver (IFFT) operating on complete channel data, and a requirement for adding redundant cyclic prefix data. The requirement for optoelectronic component bandwidth to cover a complete channel is detrimental. Further, subcarriers within the OFDM channel are sufficiently low frequency such that complex phase recovery techniques are required. As is common in classical OFDM and DMT the transmitted signal exhibits a near Gaussian distribution which demands higher Digital-Analog Conversion (DAC) and Analog-Digital Conversion (ADC) dynamic range (i.e. more bits of precision) and/or the use of additional signal processing to mitigate the high peak to average signal power.

Subband multiplexed Coherent optical OFDM extends the above concepts by stacking several OFDM channels very close together to form a quasi-continuous spectrum. For example, these are disclosed in "Coherent optical OFDM transmission up to 1 Tb/s per channel," Y. Tang and W. Shieh, J. Lightwave Techn., vol. 27, no. 16, August 2009, pp. 3511-3517, and "Optical comb and filter bank (de)mux enabling 1 Tb/s orthogonal sub-band multiplexed CO-OFDM free of ADC/DAC limits," M. Nazarathy, D. M. Marom, W. Shieh, European Conference on Optical Communications (ECOC) 2009, paper P3.12, September 2009. Advantages are the same as Optical OFDM, with an ability to extend complete channel coverage to arbitrary total capacity (Assuming synchronous data is provided). Disadvantages are similar to optical OFDM, dominated by signal processing complexity. It is unlikely that such an approach will be practical and realizable considering the associated electro-optic power consumption. Further, sharp roll-off optical filters may be required in some implementations for sub-band separation. Binary Phase Shift Keying (BPSK)

channels optically combined have been shown to be a possibility with direct detection receiver (e.g., "Over 100 Gb/s electro-optically multiplexed OFDM for high-capacity optical transport network," T. Kobayashi, et al, J. Lightwave Techn., vol. 27, no. 16, August 2009, pp. 3714-3720) and Coherent Detection (e.g., "Orthogonal wavelength-division multiplexing using coherent detection," G. Goldfarb, et al, IEEE Photonics Techn. Lett., vol. 19, no. 24, December 2007, pp. 2015-2017). Advantages are a partitioning of complexity between optical and electrical processing, such that overall complexity and power consumption can be reduced. Disadvantage stems from the fact that proper operation still requires optoelectronic bandwidth on the order of the total spectrum encompassing the complete channel, which is substantially beyond the state of the art assuming a 1000 Gbps channel. Referenced papers use lower bandwidth components, and correspondingly show a very substantial and detrimental performance penalty of several dB.

As discussed above, current state-of-the-art has several shortcomings, with each proposed implementation suffering from at least one of the following. First, complex digital signal processing is required at both transmitter and receiver (i.e. for OFDM) to compress signal spectrum and provide dispersion tolerance. The Application Specific Integrated Circuit (ASIC) size and power consumption associated with this processing is prohibitive for scaling to 1000 Gbps (1 Tb/s) transceiver. Also, for OFDM, the DAC and ADC resolution required continues to increase well beyond the current state of the art when the necessary sample rates are considered. Second, maintaining subcarrier orthogonality requires electro-optic component bandwidths that cover substantially all of a channel spectrum, which may be approximately 300 GHz wide. Components with such bandwidth are not expected to be available for many years to come. Third, performance loss associated with sub-optimal component performance or compromised digital signal processing results in a prohibitively low unregenerated link budget in fiber-optic networks.

BRIEF SUMMARY OF THE INVENTION

In an exemplary embodiment, an optical transmitter includes circuitry configured to generate a plurality of subcarriers; a plurality of data signals for each of the plurality of subcarriers; and a plurality of modulator circuits for each of the plurality of subcarriers, wherein each of the plurality of modulator circuits includes circuitry configured to offset an in-phase component from a quadrature component of one of the plurality data signals by one-half baud rate. The optical transmitter may further include prefiltering circuitry for each of the plurality of modulator circuits, wherein the prefiltering circuitry is configured to provide chromatic dispersion precompensation and pulse shaping to localize signal time and frequency content of one of the plurality data signals. The prefiltering circuitry may include one of an analog filter or a digital filter performing pulse shaping through one of Root-Raised-Cosine, Isotropic Orthogonal Transform Algorithm, or Extended Gaussian functions, and wherein the prefiltering circuitry precompensates for a predetermined amount of chromatic dispersion. Each of the plurality of modulator circuits may include a Mach-Zehnder optical modulator, and wherein the prefiltering circuitry may be configured to provide a predistortion function for compensating Mach-Zehnder optical modulator transfer curve nonlinearities. The prefiltering circuitry may include any of finite impulse response (FIR) or infinite impulse response (IIR) components with a number of taps set responsive to an amount of chromatic dispersion. The circuitry configured to generate a plurality of optical subcarriers may be configured to generate the plurality of subcarriers at frequency offsets locked to a data baud rate. The circuitry configured to generate a plurality of subcarriers may include at least one of mode-lock pulse lasers, amplitude modulation, and phase modulation of a continuous wave laser with subsequent optical selection filter. The optical transmitter may include a splitter splitting each of the plurality of subcarriers into components that will form a horizontal polarization and a vertical polarization, wherein the plurality of modulator circuits may include modulator circuits for each of the horizontal polarization and the vertical polarization of each of the plurality of subcarriers; and a polarization combiner combining these components with horizontal polarization and vertical polarization alignment to produce a polarization multiplexed signal. The plurality data signals may be encoded with amplitude and phase modulation to provide a quadrature amplitude modulation constellation.

In another exemplary embodiment, an optical modulation method includes providing a data signal; generating a plurality of optical subcarriers; splitting the data signal into a plurality of sub-data signals for each of the plurality of optical subcarriers; offsetting in-phase components and quadrature components of each of the plurality of sub-data signals by one-half baud period; and modulating each of the plurality of optical subcarriers with the offset in-phase components and quadrature components of an associated sub-data signal of the plurality of sub-data signals. The optical modulation method may further include formatting the plurality of sub-data signals for optical modulation. The optical modulation method may further include prefiltering the offset in-phase components and quadrature components prior to modulating. The optical modulation method may further include transmitting a modulated optical signal over a fiber link; receiving the modulated optical signal; splitting the modulated optical signal into N copies with N including a number of the plurality of optical subcarriers; inputting each of the N copies into a separate coherent optical hybrid along with a local oscillator at a frequency based on a frequency of an associated optical subcarrier of the plurality of optical subcarriers; and decoding the offset in-phase components and quadrature components for each of the plurality of optical subcarriers. The optical modulation method may further include postfiltering an output of each of the coherent optical hybrids.

In yet another exemplary embodiment, an optical receiver includes a splitter configured to split a received optical signal into N copies where N includes a number of subcarriers; a polarization splitter for each of the N copies splitting the received optical signal into two polarizations; a coherent optical hybrid for each of the N copies receiving the two polarizations of the received optical signal and an output from a local oscillator for each of the N copies, wherein the local oscillator includes a frequency tuned substantially to match a corresponding subcarrier frequency; a postfilter rejecting, for each of the N copies, adjacent subcarriers and adjacent symbols; and a data decoder. The received optical signal may include an offset quadrature amplitude modulation format on each of the subcarriers where in-phase components and quadrature components on each of the subcarriers are offset by one-half baud rate. The local oscillator may be locked to the corresponding subcarrier frequency through one of laser injection locking, optical phase-locked loop feedback, or subsequent processing in an electronic block. The postfilter may be configured to implement pulse-shape filtering complementary to transmitter pulse-shaping and to provide chromatic dispersion compensation. Separation of the subcarriers may be performed in an electrical domain. The optical receiver may further include circuitry configured to provide polarization mode dispersion compensation.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, an approach illustrated in the present disclosure will show approximately 60% increase in spectral efficiency, with negligible sensitivity penalty. Using Offset Quadrature phase-shift keying (OQPSK) modulation, this approach delivers 1200 Gbps within approximately 330 GHz spectral window, while conventional WDM would require approximately 550 GHz. The present invention includes an optical transceiver implementation that is scalable to channels carrying one Tbps and above; provides increased spectral utilization efficiency; allows the use of optical and electronic components limited to a fraction of the desired total capacity (i.e. approximately 40 GHz in today's state of the art); provides acceptable tolerance to chromatic dispersion, polarization mode dispersion, ASE noise, etc.; is scalable to higher-order modulation constellations, as desired; and minimizes optical and electronic processing complexity, such that size and power consumption can allow high levels of component integration and a small foot print.

Figure 1:
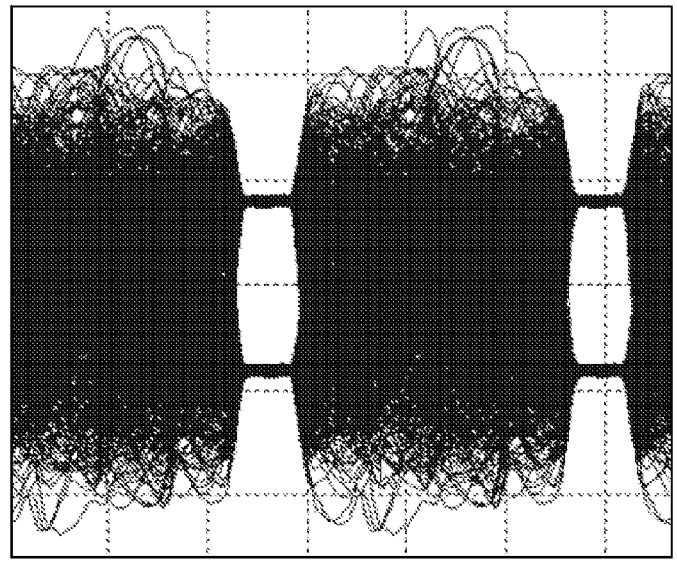
FIGS. 1 and 2 are eye diagrams of a conventional OFDM system.
Figure 2:
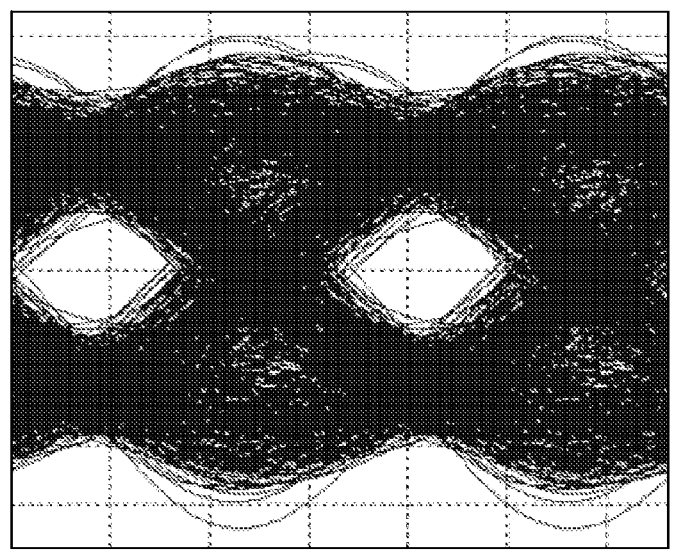

Referring to FIGS. 1 and 2, eye diagrams illustrate a conventional OFDM system. For example, conventional OFDM would require extremely wide electro-optic bandwidth Transmitter and Receiver processing to produce a clean Eye diagram. FIG. 1 illustrates an eye diagram with a system including four subcarriers with 30 GHz spacing, each carrying a 30 Gbaud QPSK signal: a total electro-optic component bandwidth of approximately 300 GHz is required. If more realistic electro-optic bandwidth of approximately 35 GHz is used, orthogonality is destroyed and a strong interference penalty is observed. FIG. 2 illustrates an eye diagram with only two subcarriers present, and already exhibits very large interference.

OFDM with QAM-modulated subcarriers is well known in wireless and DSL communication links. This format can completely eliminate Inter-Carrier Interference (ICI) and Inter-Symbol Interference (ISI) if ideal square pulse shape is used. Unfortunately, square pulse shapes have very broad frequency content and require correspondingly broadband electro-optic components. OFDM/QAM can also support dispersive channels by adding overhead bits (i.e. cyclic prefix), at the expense of increased power consumption and decreased spectral efficiency (e.g., Jinfeng Du and Svante Signell, "Classic OFDM Systems and Pulse Shaping OFDM/OQAM Systems," Technical Report of NGFDM Project, KTH/ICT/ECS, Stockholm, Sweden, February 2007 (available at www.ee.kth.se/~jinfeng/)). OFDM/QAM transmits complex valued symbols and cannot form ideal orthogonal basis functions with well-localized time and frequency extent (Balian-Low theorem).

An alternative modulation scheme has been developed more recently to address the above shortcomings (e.g., Jinfeng Du and Svante Signell, "Pulse Shape Adaptivity in OFDM/OQAM Systems," in Proc. of International Conference on Advanced Infocomm Technology, Shen Zhen, China, July 2008. (available at www.ee.kth.se/~jinfeng/) and "Analysis and design of OFDM/OQAM systems based on filterbank theory," P. Siohan, C. Siclet, and N. Lacaiile, IEEE Trans. Signal Proc., vol. 50, no. 5, May 2002, pp. 1170-1183). It relies on transmitting real-valued symbols, by effectively offsetting in-phase and quadrature components by one-half symbol period. This format is called Offset-QAM modulation. A key benefit of Offset-QAM is its ability to support pulse-shaping such as Root-Raised-Cosine, Isotropic Orthogonal Transform Algorithm (IOTA), and Extended Gaussian functions (EGF). Such functions provide signals which are well-localized in frequency and time.

Figure 3:
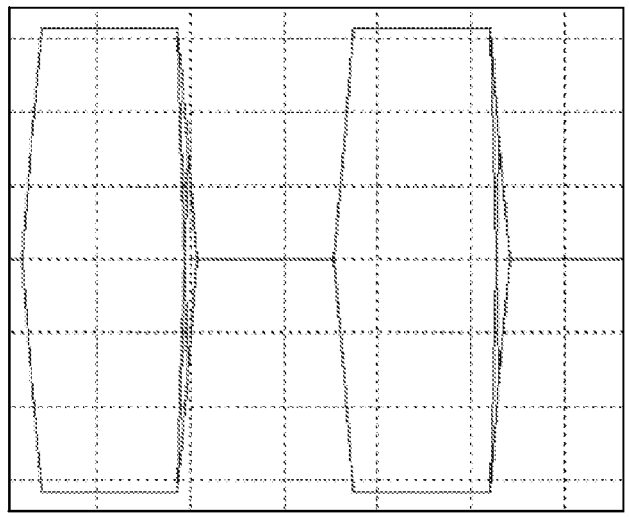
FIGS. 3 and 4 are diagrams of I and Q modulation drive signals, each occupying ½ baud period, and offset by one-half baud relative to each other.
Figure 4:
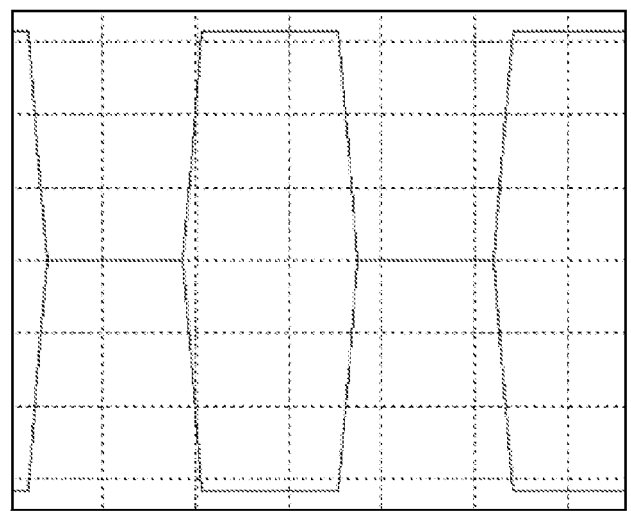

Referring to FIGS. 3 and 4, I and Q modulation drive signals are illustrated, each occupying ½ baud period, and offset by one-half baud relative to each other. The present invention includes an optical transceiver implementation which uses Offset-QAM approach to provide a significant benefit. In the various exemplary embodiments illustrated herein, the present invention is illustrated with Offset-QPSK (i.e. four-QAM) modulation using a Root-Raised-Cosine pulse shaping filter. Those of ordinary skill in the art will recognize these are merely an exemplary embodiment for illustration purposes and the present invention can be readily extended to higher modulation orders (i.e. M-QAM) and to other pulse shaping functions such as IOTA and EGF.

Figure 5:
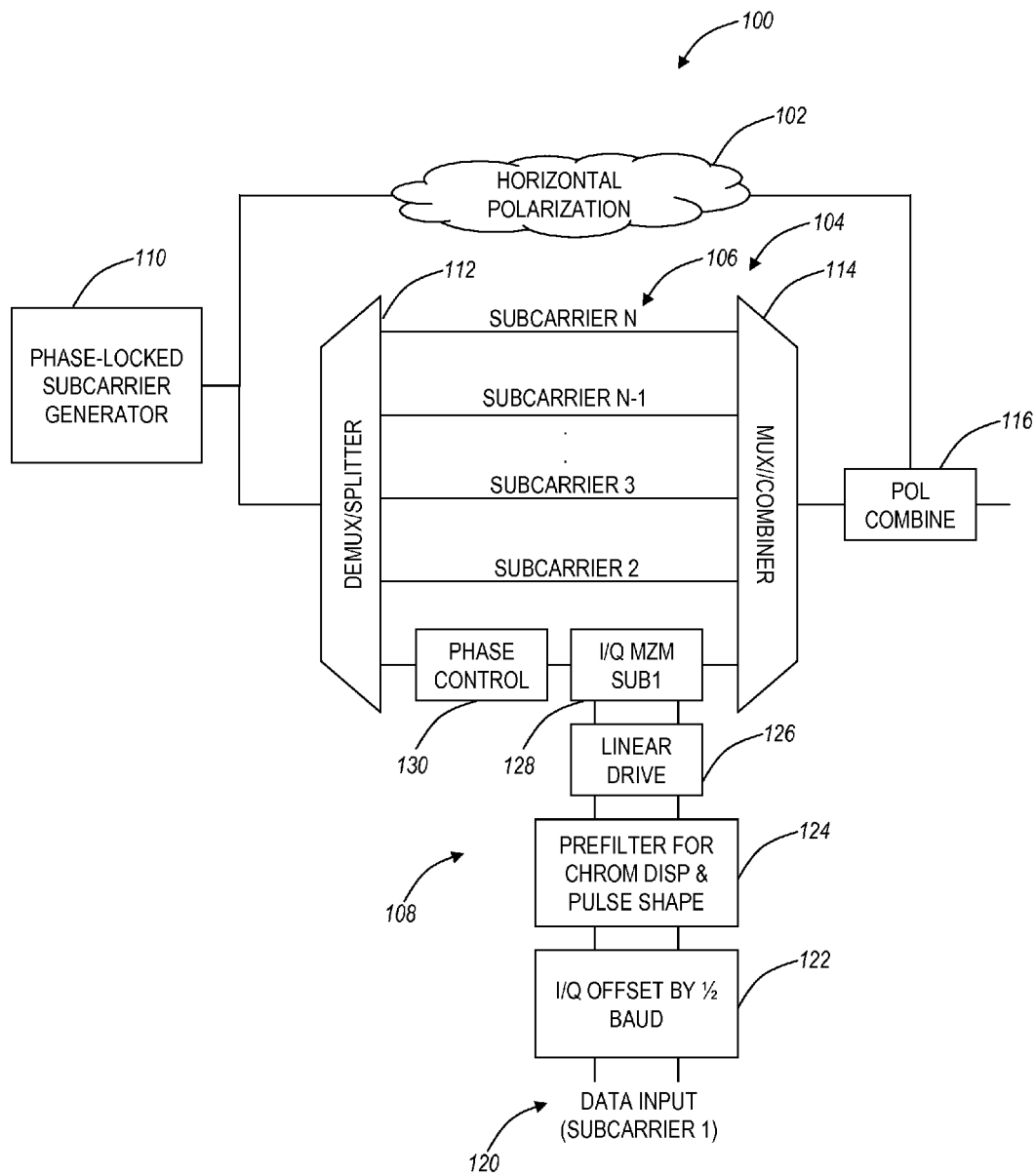
FIG. 5 is a block diagram of an offset-QAM optical multitone transmitter according to an exemplary embodiment of the present invention.

Referring to FIG. 5, in an exemplary embodiment, a block diagram is illustrated of an offset-QAM optical multitone transmitter 100. The transmitter 100 includes two polarizations—a horizontal polarization 102 and a vertical polarization 104. Each of the polarizations 102, 104 includes a plurality of subcarriers 106 (e.g., up to N subcarriers, N being an integer). For illustration purposes, the horizontal polarization 102 is omitted including the plurality of subcarriers 106 associated with the horizontal polarization.

Also, the vertical polarization 104 is illustrated omitting components for the plurality of subcarriers 106 except for components associated with a first subcarrier 108 in the vertical polarization 104. It is understood that the horizontal polarization 102 will include the same components as the vertical polarization 104, and that each of the subcarriers 106 will include the same components as the subcarrier 108. Additionally, the present invention may be implemented without polarization multiplexing as well.

Several phase-locked subcarriers, for the plurality of subcarriers 106, are generated by a phase-locked subcarrier generator 110, with frequency offset precisely locked to the data baud rate. Subcarrier generation can be accomplished through a variety of methods, including filtering of mode-locked pulse lasers, phase modulation of continuous wave (CW) laser, etc. Subcarriers are split to provide identical signals for the horizontal and vertical optical polarization 102, 104 components. The output of the subcarrier generator 110 is connected to a demultiplexer/splitter 112 which breaks out each individual subcarrier 106, 108 for data modulation. Subsequent to data modulation of each of the subcarriers 106, 108, the subcarriers 106, 108 are combined through a multiplexer/combiner 114 and the horizontal polarization 102 and the vertical polarization 104 are combined with a polarization combiner 116.

In various exemplary embodiments, the present invention includes data modulation of each of the subcarriers 106, 108 whereby in-phase (I) components are one-half baud offset from quadrature (Q) components. For example, assume the Offset-QAM optical multitone transmitter 100 is utilized to transmit an incoming data stream of 1000 Gbps. Incoming data (i.e. 1000 Gbps stream) is processed such that it is demultiplexed into two polarizations and N (i.e. 10) streams with identical bit rate (i.e. 50 Gbps per subcarrier per polarization). This data may be further encoded with amplitude and phase modulation to provide a QAM-like constellation, as for example 4-QAM or QPSK. The processing of the incoming data provides an in-phase (I) and a quadrature (Q) component as data input 120 for each of the subcarriers 106, 108. An offset block 122 offsets the in-phase component by one-half baud from the quadrature component, and both of these signals are provided to a prefilter block 124. The prefilter block 124 may be implemented as a digital or analog filter or a look-up table, and may have finite impulse response (FIR) and/or Infinite impulse response (IIR) components. The prefilter block 124 provides both chromatic dispersion precompensation, and a pulse shaping function to localize signal time and frequency content. In may also include additional filtering to provide a predistortion function for compensating Mach-Zehnder optical modulators (MZM) transfer curve nonlinearities. Outputs from the prefilter block 124 are connected to a linear drive 126 which drives an I/Q MZM modulator 128 thereby modulating the subcarrier 108. Additionally, the subcarrier 108 may include phase control 130. Note, the output of the I/Q MZM modulator 128 connects to the multiplexer/combiner 114 where each of the data modulated subcarriers 106, 108 are combined and then further combined by polarization 102, 104. Note, each of the subcarriers 106 for both the horizontal polarization 102 and the vertical polarization 104 may include the same components 120-130 as the first subcarrier 108 for modulating the other subcarriers 106.

Figure 6:
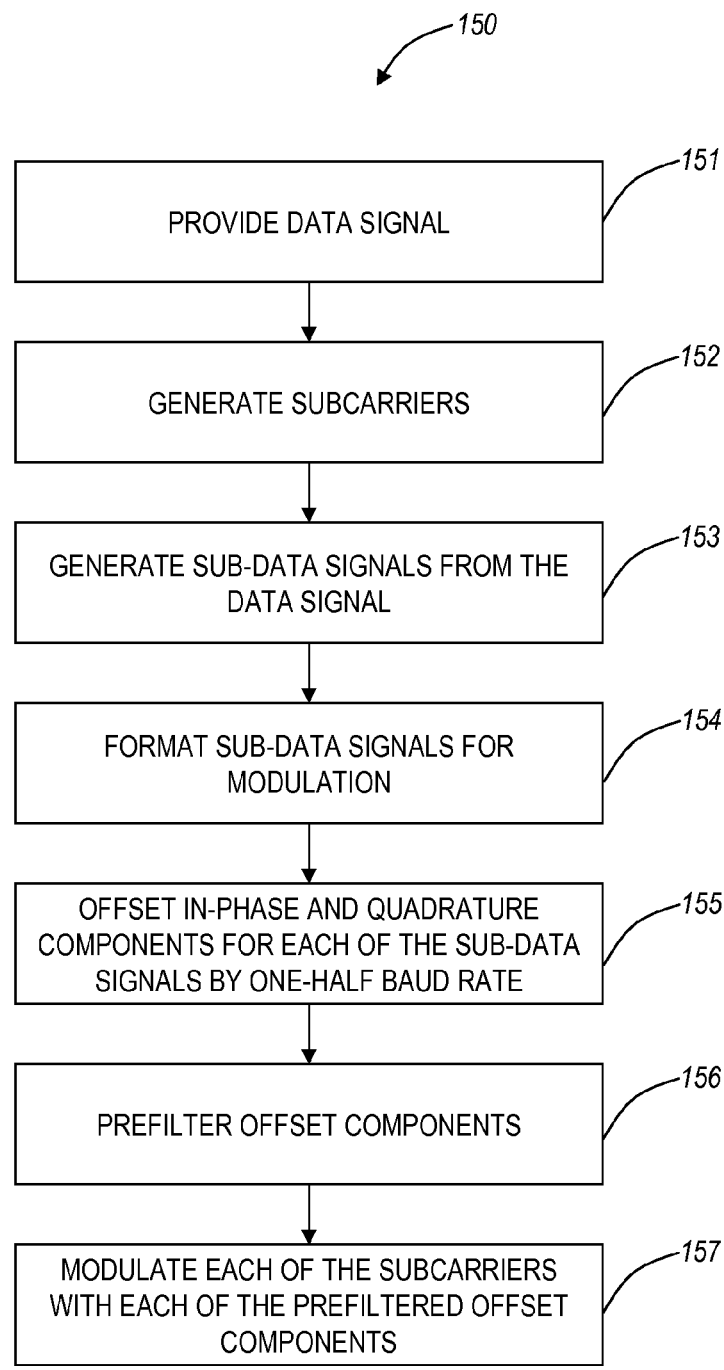
FIG. 6 is a flowchart of a modulation method according to an exemplary embodiment of the present invention.

Referring to FIG. 6, in an exemplary embodiment, a flowchart illustrates a modulation method 150 of the present invention. As described herein, the modulation method 150 may be utilized to modulate a data signal using OFDM with QAM-modulated subcarriers. A data signal is provided (step 151) and a plurality of subcarriers are generated (step 152). From the data signal, sub-data signals are generated (step 153). Here, the sub-data signals are generated for modulation on each of the subcarriers. For example, assume the data signal is 1000 Gbps and there are N subcarriers and two polarizations (horizontal and vertical), then the sub-data signals would each be 1000 divided N divided by two. Each of the sub-data signals is formatted for modulation on the subcarriers (step 154). Here, formatting the sub-data signals may include precoding or the like forming in-phase and quadrature components as required by the specific modulation format utilized. The present invention contemplates any of the following modulation formats for the sub-data signals including 4-QAM, QPSK, M-QAM, etc. The in-phase and quadrature components are offset from one another for each of the sub-data signals by one half baud period (step 155). This offset forms an Offset QAM modulation for each of the sub-data signals. Each of these offset signals is prefiltered (step 156). A key benefit of offset QAM modulation is its ability to support pulse-shaping such as Root-Raised-Cosine, IOTA, and Extended Gaussian functions (EGF). Such functions provide signals which are well-localized in frequency and time. This prefiltering is performed to provide both chromatic dispersion precompensation, and a pulse shaping function to localize signal time and frequency content. Finally, each of the subcarriers is modulated with each of the prefiltered offset components (step 157).

The Offset-QAM optical multitone transmitter 100 and the modulation method 150 are generally configured to provide an optical signal over an optical fiber. The optical signal propagates over optical fiber, and the optical fiber's chromatic dispersion may partially unwrap signal predistortion imposed at the multitone transmitter 100 or by the modulation method 150. The optical fiber may also include optical dispersion compensation modules (DCMs), such that overall link dispersion is within signal processing range accommodated by transmitter and receiver modules. Thus, overall electronic filter complexity and power dissipation can be managed and maintained within required bounds, i.e. compensation may be shared between the predistortion from the prefiltering and the associated link DCMs.

Figure 7:
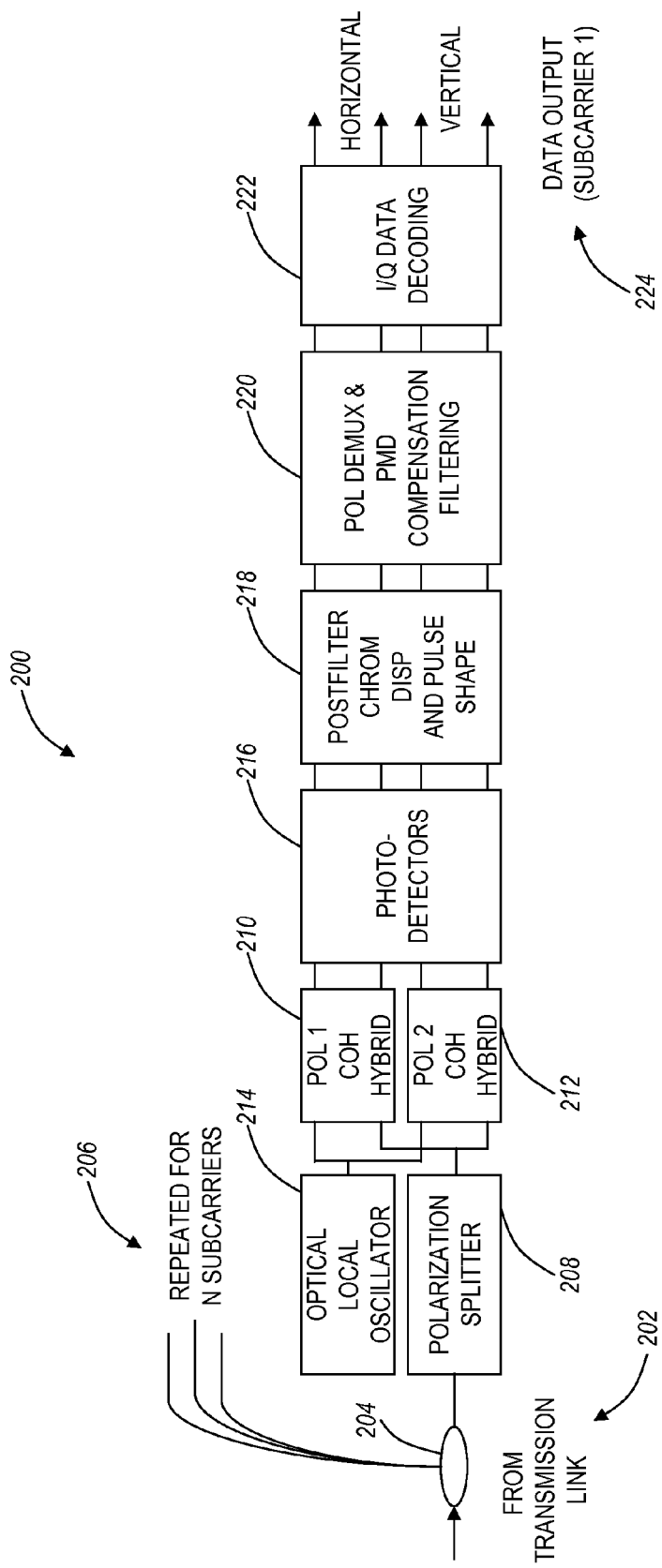
FIG. 7 is a block diagram of an optical multitone coherent receiver according to an exemplary embodiment of the present invention.

Referring to FIG. 7, in an exemplary embodiment, a block diagram is illustrated of an optical multitone coherent receiver 200. The coherent receiver 200 may be utilized with the Offset-QAM optical multitone transmitter 100 and the modulation method 150, for example. An incoming optical signal from a transmission link 202 is split with a splitter 204 into N copies 206. For illustration purposes, components are illustrated only for a first copy of the N copies 206. It is understood that each of the N copies 206 will include the same components as the first copy. Each of the N copies 206 is polarization demultiplexed with a polarization splitter 208 to separate the horizontal and vertical optical polarizations. The polarization splitter 208 feeds the horizontal and vertical optical polarizations (i.e. polarizations one and two) into an optical coherent hybrid 210, 212. It should be noted that an optical filter is not required at this point (in the optical domain), since subcarrier separation is performed in the electrical domain. An optical local oscillator (LO) 214 is provided for each subcarrier, with the LO 214 frequency being tuned substantially to match corresponding subcarrier frequency. The LO 214 may be locked to the subcarrier through laser injection locking, through optical phase-locked loop feedback, or via subsequent processing in the electronic block. Outputs of the hybrid 210, 212 are connected to photodetectors 216 that convert optical signals into electrical signals. A postfilter 218 is provided that implements pulse-shape filtering complementary to the transmitter pulse-shaping, such that adjacent subcarriers and adjacent symbols are substantially rejected based on which copy is being addressed of the N copies 206 (e.g., the first copy would reject all but the first subcarrier). The postfilter 218 can also include additional chromatic dispersion compensation components. Similar to transmitter, it may be implemented as a digital or analog filter. Note that no bandwidth or power is wasted on guard bands or cyclic prefix in this implementation. Subsequent additional processing is provided through a filter 220 to separate polarizations and provide polarization mode dispersion compensation (PMDC). Finally, subcarrier data is decoded through an I/Q data decoder 222 providing data output 224 of the particular subcarrier.

Figure 8:
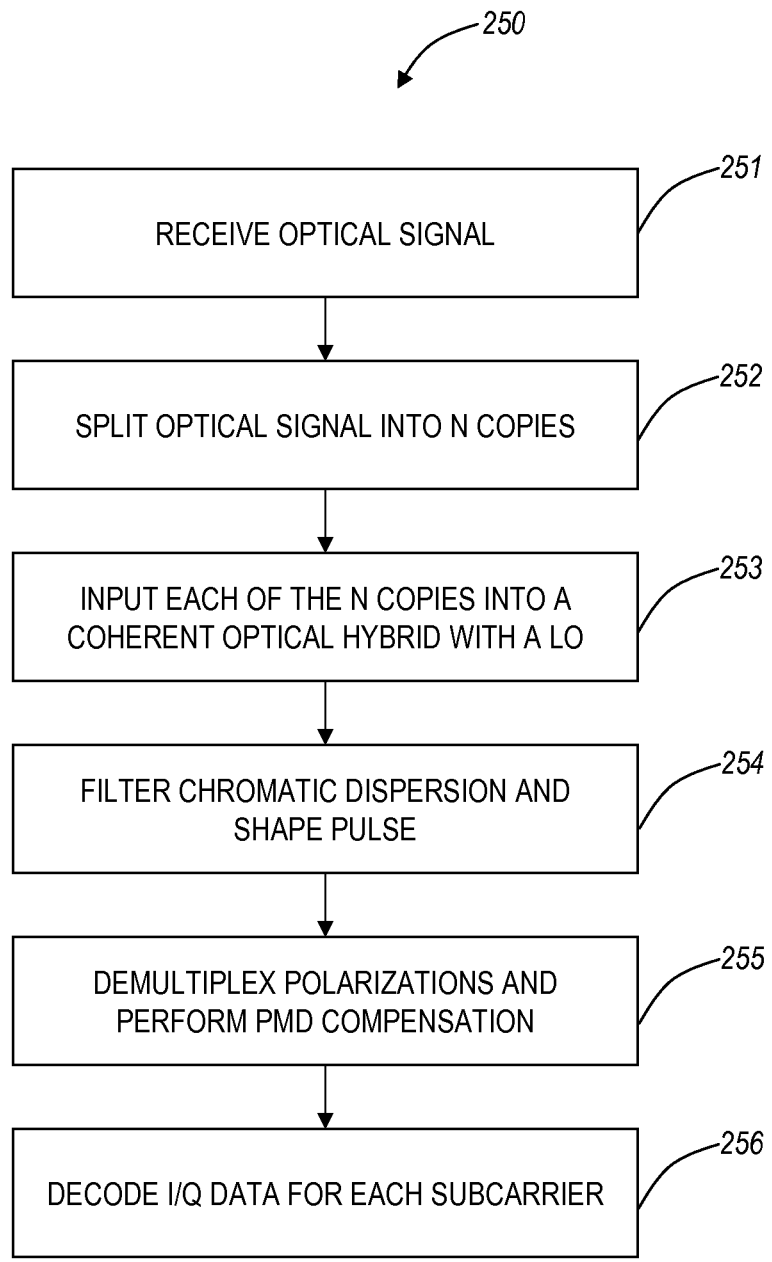
FIG. 8 is a flowchart of a demodulation method according to an exemplary embodiment of the present invention.

Referring to FIG. 8, in an exemplary embodiment, a flowchart illustrates a demodulation method 250 of the present invention. As described herein, the demodulation method 250 may be utilized to demodulate a data signal using OFDM with QAM-modulated subcarriers. The demodulation method 250 receives an optical signal (step 251) with offset QAM-modulated subcarriers and splits the optical signal into N copies with N equal to the number of subcarriers (step 252). Each of the N copies is input into a coherent optical hybrid with a local oscillator (LO) at a frequency matching the corresponding subcarrier frequency associated with the copy (step 253). An output of the coherent optical hybrid is filtered for chromatic dispersion and the pulse is shaped thereby counteracting pulse shaping performed at the transmitter (step 254). Note, the subcarrier may be filtered out electronically thereby removing all other subcarriers except the subcarrier of interest (i.e., with the associated frequency of the LO). The subcarrier is polarization demultiplexed and polarization mode dispersion (PMD) may be compensated (step 255). Finally, the I/Q data is decoded for the subcarrier (step 256).

Figure 9:
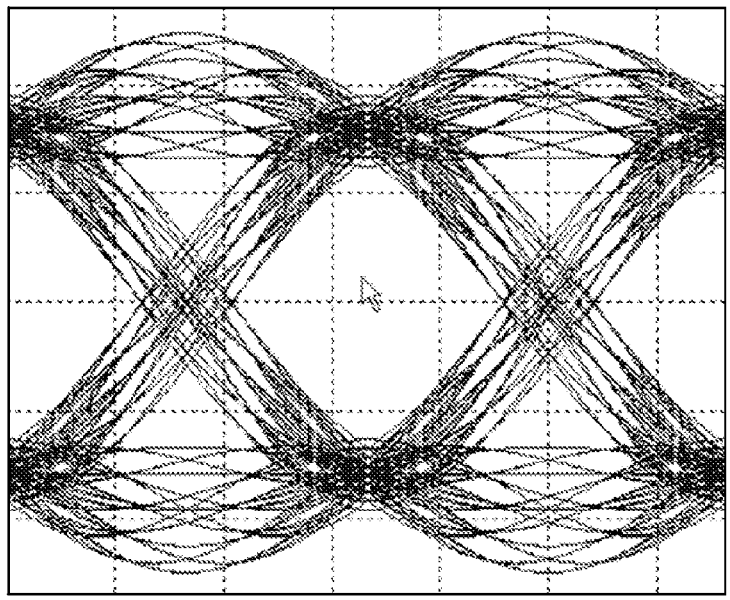
FIGS. 9 and 10 are diagrams for an offset-QAM transceiver of the present invention with ten subcarriers on 30 GHz spacing with each subcarrier carrying 30 Gbaud offset-QPSK on each polarization.
Figure 10:
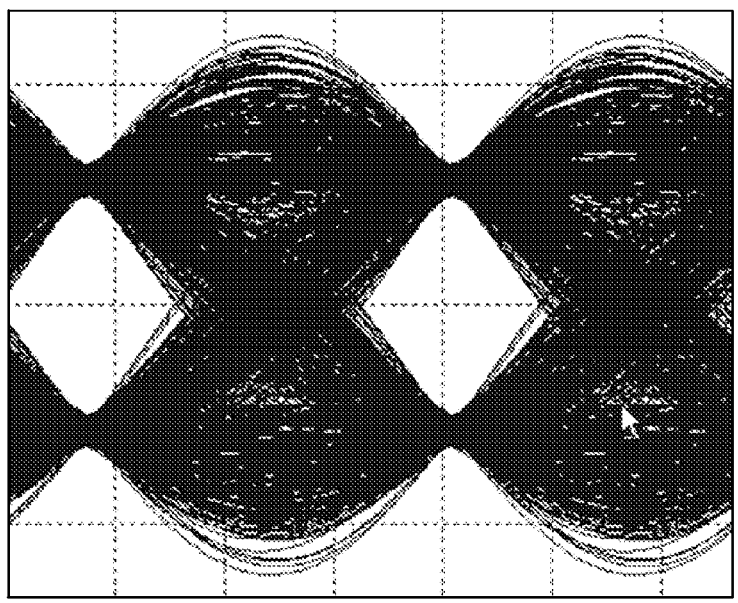

Referring to FIGS. 9 and 10, in exemplary embodiments, diagrams are illustrated for an Offset-QAM transceiver of the present invention with ten subcarriers on 30 GHz spacing with each subcarrier carrying 30 Gbaud offset-QPSK on each polarization. Further, a Root-Raised-Cosine with 0.1 roll-off factor was utilized as a pulse shaping filter. FIG. 9 is a diagram of a drive signal provided to the I-side of MZM modulator, and FIG. 10 is a demodulated eye diagram for the 10-subcarrier×30 Gbaud OFDM/O-QPSK with 40 GHz Tx and 30 GHz Rx bandwidth, and no cyclic prefix. Note that in contrast to FIG. 2, the plot in FIG. 10 shows a wide-open eye with minimal distortions or interference in the center of the baud period.

Figure 11:
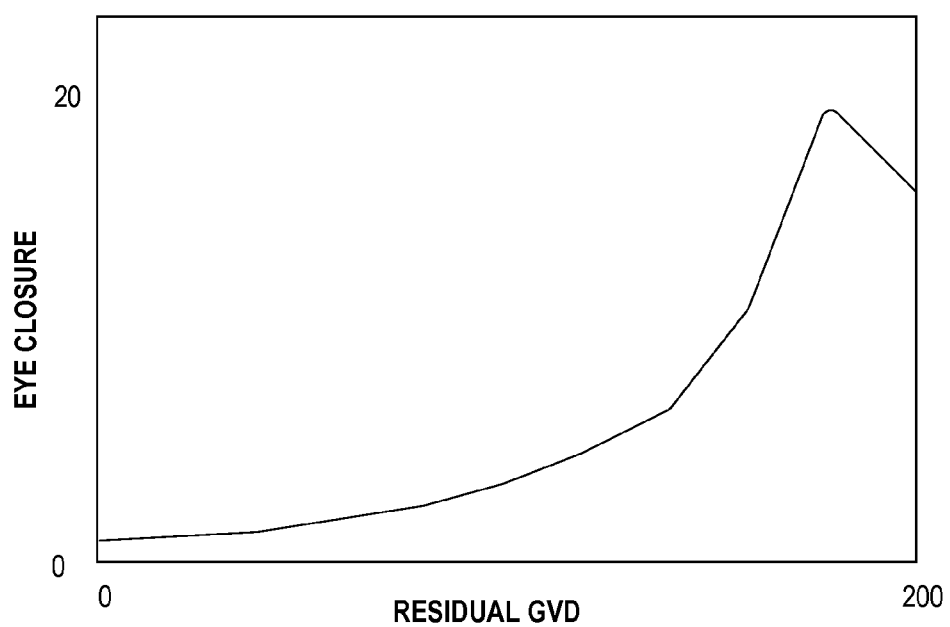
FIG. 11 is a diagram of an eye closure diagram of one of the detected subcarriers at 30 Gbaud in FIG. 10.

Referring to FIG. 11, in an exemplary embodiment, an eye closure diagram is illustrated of one of the detected subcarriers at 30 Gbaud in FIG. 10. The stability of the modulation format and intrinsic, uncompensated chromatic dispersion tolerance of the present invention shows that cyclic prefix is not required. The eye closure, shown in FIG. 11, is commensurate with one observed for a single 30 Gbaud QPSK signal, without adjacent subcarriers. This shows that adjacent subcarriers are effectively rejected at the receiver. In contrast, more conventional modulation would show much lower dispersion tolerance, commensurate with the complete 10-subcarrier spectral width.

Figure 12:
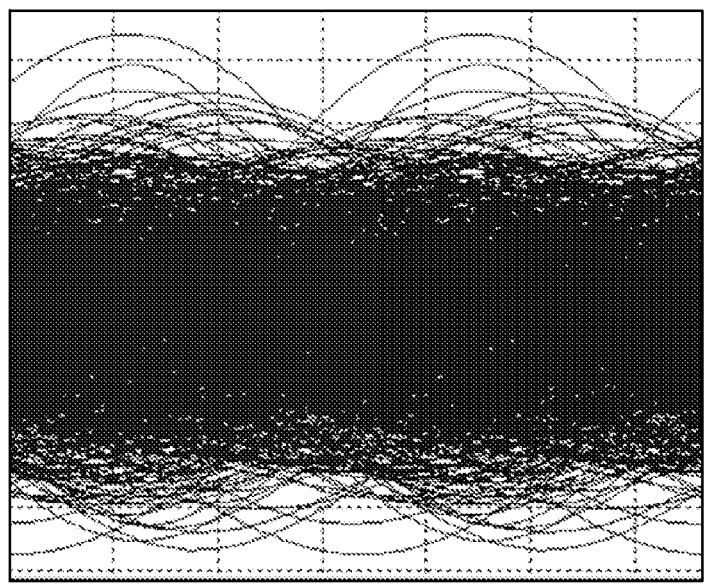
FIGS. 12 and 13 are diagrams for an offset-QAM transceiver of the present invention with predistortion and with chromatic dispersion.
Figure 13:
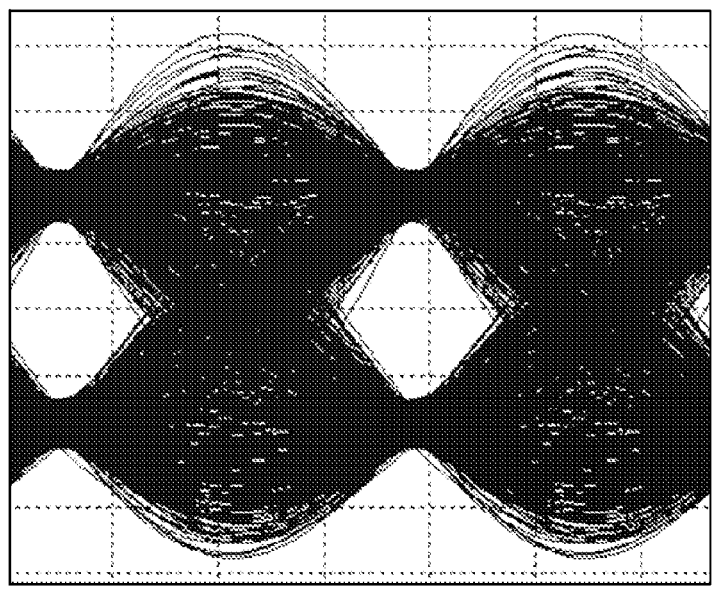

Referring to FIGS. 12 and 13, in exemplary embodiments, diagrams are illustrated for an Offset-QAM transceiver of the present invention with predistortion and with chromatic dispersion. Specifically, FIG. 12 is a drive signal diagram provided to the I-side of MZM modulator assuming −1000 ps/nm predistortion. FIG. 13 is a demodulated Eye diagram for 10-subcarrier×30 Gbaud OFDM/O-QPSK with 40 GHz Tx and 30 GHz Rx bandwidth, and no cyclic prefix, assuming +1000 ps/nm of fiber chromatic dispersion. The present invention provides substantially linear modulation of the transmitted optical E-field, and a coherent receiver provides substantially linear detection of the E-field. Therefore, transmitter linear fiber transfer function and the receiver form a linear filter cascade. Effects such as chromatic dispersion, polarization mode dispersion and polarization rotation can be completely compensated. For example, it may be chosen to compute predistorted drive signal for the MZM to compensate for a specified range of chromatic dispersion. FIG. 12 shows a drive signal predistorted for −1000 ps/nm of chromatic dispersion, and a corresponding demodulated eye diagram is shown in FIG. 13 after propagation through a linear fiber link with +1000 ps/nm of chromatic dispersion.

The FIR filter requires an increasing number of taps to compensate for chromatic dispersion, with tap count at 2× oversampling approximately set as:

$$N_{taps} = 2 \cdot 10^{-5} \cdot |D| \cdot R_{sym}^2$$

Assuming dispersion (D)=−1000 ps/nm, and symbol rate ($R_{sym}$)=30 Gbaud, then the number of taps ($N_{taps}$)=2×10⁻⁵×1000×30²=18 taps.

Figure 14:
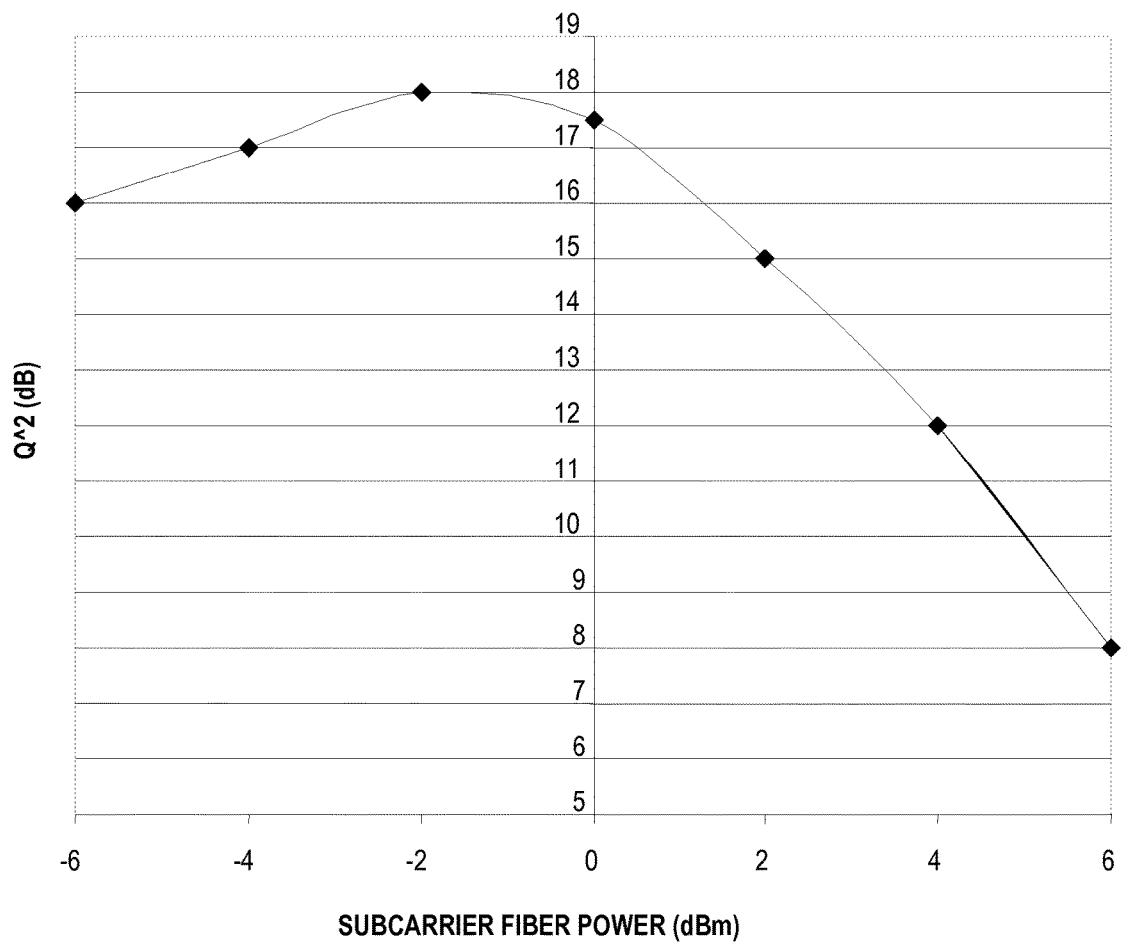
FIG. 14 is a diagram of simulated Q-factor for a 5×20 dB Non-Dispersion Shifted Fiber (NDSF) line with Erbium Doped Fiber Amplifiers (EDFA).

Referring to FIG. 14, in an exemplary embodiment, a diagram illustrates simulated Q-factor for a 5×20 dB Non-Dispersion Shifted Fiber (NDSF) line with Erbium Doped Fiber Amplifiers (EDFA). Advantageously, the modulation format of the present invention is tolerant to nonlinear fiber propagation characteristics as well. Nonlinear fiber propagation was investigated using a numeric simulator OptSim (available from RSoft Design Group), with complete modeling of various noise and distortion impairments. FIG. 14 shows a modeled Q-factor for a five-span NDSF system with EDFA amplifiers. Subcarrier power of approximately −1 dBm appears to be close to optimal, which corresponds to +9 dBm for the complete 10-subcarrier signal. Forward error correction (FEC) fail threshold is approximately at a Q of 11 dB, and 6 dB of system margin is still observed.

Advantageously, the present invention addresses multiple shortcomings of the prior art simultaneously, and provides a robust and flexible architecture to accommodate scalable channel data rate increase. It is ability to arbitrarily tradeoff the number of carriers versus the bandwidth of those carriers without the loss of spectral efficiency that results from traditional DWDM approaches, that provides the novelty in the proposed scheme. Additionally, the present invention requires minimized electronic processing, achievable either in analog or digital domains; provides support for sufficient impairment compensation (chromatic and polarization mode dispersion, polarization demultiplexing); includes the ability to use available, realistic electro-optic bandwidth components without additional interference penalties enabling avoidance of extremely wide bandwidth electro-optical, electrical and DSP components; is scalable to wide channel bandwidth, in excess of 100 Gbps, and targeting 1000 Gbps and higher; enables a reduction in the total number of orthogonal carriers, which has been shown to reduce composite signal peak/average power ratio (PAPR), and increase nonlinear immunity; enables elimination of guard bands between subcarriers, providing a substantial spectral efficiency improvement; enables highly integrated complementary metal oxide semiconductor (CMOS)-based implementations for low cost and low footprint; enables direct integration of electronic and optical functions on the same die or multi-chip module; and provides an increase in spectral efficiency over conventional WDM systems.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical receiver, comprising:
   a splitter configured to split a received optical signal into N copies where N comprises a number of subcarriers;
   a polarization splitter for each of the N copies configured to split the received optical signal into two polarizations;
   a coherent optical hybrid for each of the N copies configured to receive the two polarizations of the received optical signal and an output from a local oscillator for each of the N copies, wherein the local oscillator comprises a frequency tuned substantially to match a corresponding subcarrier frequency;
   a postfilter located subsequent to the coherent optical hybrid configured to reject, for each of the N copies, adjacent subcarriers and adjacent symbols based on which copy of the N copies is being addressed and the postfilter configured to implement pulse-shape filtering complementary to transmitter pulse-shaping and to provide chromatic dispersion compensation; and
   a data decoder.

2. The optical receiver of claim 1, wherein the received optical signal comprises an offset quadrature amplitude modulation format on each of the subcarriers where in-phase components and quadrature components on each of the subcarriers are offset by one-half baud rate, and wherein each subcarrier is modulated with a corresponding sub-data signal and a data signal is collectively formed by a plurality of sub-data signals.

3. The optical receiver of claim 2, wherein the local oscillator is locked to the corresponding subcarrier frequency through one of laser injection locking, optical phase-locked loop feedback, or subsequent processing in an electronic block.

4. The optical receiver of claim 2, wherein separation of the subcarriers is performed in an electrical domain.

5. The optical receiver of claim 2, further comprising:
   circuitry configured to provide polarization mode dispersion compensation.

6. The optical receiver of claim 1, wherein the data decoder forms a composite electrical signal with at least 1 Tb/s and utilizes less than 500 GHz of optical spectral width.

7. An optical transceiver, comprising:
   a transmitter portion comprising:
      circuitry configured to generate a plurality of optical subcarriers;
      a plurality of data signals for each of the plurality of subcarriers;
      a plurality of modulator circuits for each of the plurality of subcarriers; and
      polarization multiplexing components for each of the plurality of subcarriers; and
   a receiver portion comprising:
      a splitter configured to split a received optical signal into N copies where N comprises a number of the;
      a polarization splitter for each of the N copies configured to split the received optical signal into two polarizations;
      a coherent optical hybrid for each of the N copies configured to receive the two polarizations of the received optical signal and an output from a local oscillator for each of the N copies, wherein the local oscillator comprises a frequency tuned substantially to match a corresponding subcarrier frequency; and
      a postfilter located subsequent to the coherent optical hybrid configured to reject, for each of the N copies, adjacent subcarriers and adjacent symbols based on which copy of the N copies is being addressed and the postfilter configured to implement pulse-shape filtering complementary to transmitter pulse-shaping and to provide chromatic dispersion compensation.

8. The optical transceiver of claim 7, wherein each of the plurality of modulator circuits comprises circuitry configured to offset an in-phase component from a quadrature component of one of the plurality data signals by one-half baud period.

9. The optical transceiver of claim 7, wherein the received optical signal comprises an offset quadrature amplitude modulation format on each of the subcarriers where in-phase components and quadrature components on each of the subcarriers are offset by one-half baud rate, and wherein each subcarrier is modulated with a corresponding sub-data signal and a data signal is collectively formed by a plurality of sub-data signals.

10. The optical transceiver of claim 7, wherein the polarization multiplexing components further comprise:
    a splitter splitting each of the plurality of subcarriers into two components, wherein the plurality of modulator circuits comprise modulator circuits for each of the plurality of subcarrier components; and
    a polarization combiner combining each of the subcarrier components to form a polarization multiplexed signal with horizontal and vertical components.

11. An optical demodulation method, comprising:
    splitting a received optical signal into N copies with N comprising a number of subcarriers associated with the received optical signal, wherein the received optical signal comprises an offset quadrature amplitude modulation format on each of the subcarriers where in-phase components and quadrature components on each of the subcarriers are offset by one-half baud rate, and wherein each subcarrier is modulated with a corresponding sub-data signal and a data signal is collectively formed by a plurality of sub-data signals;
    inputting each of the N copies into an associated coherent optical hybrid with a local oscillator at a frequency matching a corresponding subcarrier frequency associated therewith;
    filtering, via a postfilter, subsequent to the coherent optical hybrid an output of each the associated coherent optical hybrids for chromatic dispersion, for pulse shaping, and for rejecting, for each of the N subcarriers, adjacent subcarriers and adjacent symbols based on which copy of the N copies is being addressed; and
    performing data decoding for each of the N subcarriers.

12. The optical demodulation method of claim 11, further comprising:
    performing the filtering electronically thereby removing all other subcarriers except a subcarrier of interest.

13. The optical demodulation method of claim 11, further comprising:
    performing polarization demultiplexing on each of the N subcarriers and polarization mode dispersion compensation.

14. The optical demodulation method of claim 11, further comprising:
  combining the decoded data from each of the N subcarriers to form a composite electrical signal.

15. The optical demodulation method of claim 14, wherein the composite electrical signal comprises at least 1 Tb/s and utilizes less than 500 GHz of spectral width.

* * * * *